UNITED STATES PATENT OFFICE.

JOHN KARSTAIRS, OF DARTFORD, ENGLAND.

EXPLOSIVE.

SPECIFICATION forming part of Letters Patent No. 625,685, dated May 23, 1899.

Application filed March 11, 1899. Serial No. 708,657. (No specimens.)

*To all whom it may concern:*

Be it known that I, JOHN KARSTAIRS, a subject of the Queen of Great Britain and Ireland and Empress of India, and a resident of Dartford, in the county of Kent, England, have invented Improvements in the Manufacture of Explosives, of which the following is a specification.

My invention relates to the manufacture of explosives, and more particularly such as are known as "high explosives" for filling torpedoes, shells, mines, and for mining purposes, such as quarrying.

The main object of my invention is to produce an explosive of this character which shall be stable, non-hygroscopic, and safe.

In carrying out my invention I make use of the new compound and mode of preparing it described in an application for a patent executed of even date herewith and filed March 11, 1899, Serial No. 708,656, the said new compound being the product of the slow nitration of a mixture of urea and alcohol.

As described in my aforesaid application, I may employ ordinary urine and reduce it by evaporation to, say, one-tenth ($\frac{1}{10}$) its volume, or in place of this I may employ a solution of artificial urea in, say, one and three-quarters ($1\frac{3}{4}$) its weight of water. With this is mixed one-third ($\frac{1}{3}$) its volume of alcohol—say methylated alcohol. To this mixture is added at intervals of, say, twelve hours a quantity of nitric acid, preferably of a specific gravity of 1.45. Each such addition should be about equal to the one-hundredth ($\frac{1}{100}$) part of the combined other fluids, and such additions are continued until, say, twenty such portions have been added. The product of this slow nitration of the mixture of urea and alcohol is a compound which on drying at a temperature below 150° Fahrenheit is in the form of very light yellow needle-form crystals of the definite composition described by the empirical formula $CH_3N_3O_5$ and the graphic formula, as I presume,

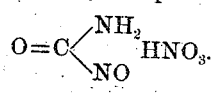

The compound has the physical properties that it is soluble in water, (completely so in one and one-half times its own weight of water at 60° Fahrenheit,) is slightly soluble in either alcohol or ether, is insoluble in the paraffins and olefins, and has a specific gravity of 1.8. It is very difficult to say exactly what does take place in a reaction covering, as this nitrating process does, a considerable space of time between organic bodies like urea and alcohol; but my investigations have led me to believe that this reaction is represented by the equation:

This represents, of course, only the first and final states. Light carbureted hydrogen is given off during the process. I now combine with this compound, which is preferably reduced to a granular form by grinding, a protective coating to make it stable and non-hygroscopic. For this purpose I may use "gum," which term I use in a sufficiently general sense to include caoutchouc, india-rubber, gum-arabic, &c. If caoutchouc be used, it is dissolved or partially dissolved in naphtha, benzol, or toluene, and the solution is incorporated with the above-described compound, so as to practically coat the grains thereof.

With the aid of the above-described product I make a safe and stable high explosive by incorporating the said product with chlorates or perchlorates. For instance, I may combine one part of the above-described product with seven parts of potassium chlorate. This may be made up into any suitable form—as, for instance, a more or less plastic composition for use in blasting. For filling shells or torpedoes the composition may be in a more or less semifluid condition. This is secured by not thoroughly drying out the gum solvent before combining the nitrated cellulose with the product herein described.

Where in my claim I use the term "chlorate" I employ it in a sufficiently general sense to include a perchlorate as well as a chlorate *per se.*

I claim as my invention—

As a new article of manufacture, the herein-described explosive consisting in the combination of a chlorate with a crystalline body soluble in water, with a specific gravity of 1.8 and having the empirical formula $CH_3N_3O_5$, and a protective coating for the said body, substantially as described.

In testimony whereof I have signed my name to this specification in the presence of two subscribing witnesses.

JOHN KARSTAIRS.

Witnesses:
F. WARREN WRIGHT,
HUBERT HOWSON.